United States Patent Office 3,652,499
Patented Mar. 28, 1972

3,652,499
SOLVENT RESISTANT POLYESTERS
Willem F. H. Borman, Pittsfield, Mass., assignor to General Electric Company
No Drawing. Filed Apr. 29, 1969, Ser. No. 820,338
Int. Cl. C08g 17/06, 17/08
U.S. Cl. 260—49                          12 Claims

ABSTRACT OF THE DISCLOSURE

This invention is for a novel class of linear polyesters having the repeating structural unit

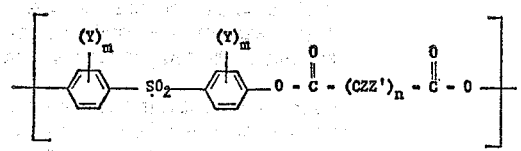

where Y is an inert substituent on the phenylene nucleus; Z and Z' are individually selected from the group of hydrogen, lower alkyl and halogen; the letter $m$ is any whole number from and including 0 to the number of positions on the phenylene nucleus available for substitution; and the letter $n$ is 1, 3 or 5. The polymer preferably has sufficient repeating units to have a molecular weight of at least 10,000. Preferred polymers are derived from 4,4'-sulfonyl diphenol; 4,4' - sulfonyl-di-(2,6-xylenol); 4,4'-sulfonyl-bis-(2,6-dichloro phenol) or 4,4'-sulfonyl-(2,6-dibromo phenol) and glutaric acid. The polyesters of this invention are similar in structure to polyesters of the prior art, but are distinguishable therefrom by unexpectedly superior solvent resistant properties.

BACKGROUND OF THE INVENTION

(1) Field of the invention

This invention relates to sulfonyl containing synthetic resins prepared from phenols and more particularly, to polyesters that are derived from a 4,4'-sulfonyl-diphenol and an aliphatic polybasic carboxylic acid.

(2) Description of the prior art

Polyesters that are the reaction products of a difunctional alcohol and a difunctional acid are well-known in the art and described in numerous publications including The Modern Plastics Encyclopedia for 1968, McGraw-Hill Publications, New York, Volume 45, No. 14A, pages 264 to 266. Moreover, polyesters that are the reaction products of a diphenol and a dicarboxylic acid are also well-known in the art. These polyesters possess a wide range of desirable physical and electrical properties which make them useful for a multitude of commercial operations. However, they are characterized by poor resistance to organic solvents. This is a serious limitation as it prohibits the use of these polyesters for applications where they may be exposed to solvents or their vapors, such as in the automotive under-the-hood uses. Other resins known to possess good solvent resistance, such as the acetal resins, may not be substituted for these polyesters because they lack the strength and stiffness properties at elevated temperatures required for such usage.

An early patent showing the formation of polyesters having a chemical structure similar to the polyester of the subject invention is U.S. Pat. No. 2,035,578 where the polymers are formed by the reaction of a polyhydric phenol with an organic polybasic acid or a derivative thereof. Preferred phenols disclosed in the patent are the polynuclear phenols where two aromatic nuclei are separated by intermediate secondary or tertiary carbon atoms of which, di(4-hydroxyphenyl) dimethylmethane is typical. In Example 2 of this patent, there is shown the reaction of phthalyl chloride with di(4 - hydroxyphenyl)-dimethylmethane. It is reported that the resin formed is soluble in alcohol, toluol and many known ester solvents. In Example 3, the procedure is repeated using adipyl chloride and other acid chlorides. The polymer formed with adipyl chloride is reported flexible, but as the aliphatic chain length decreases, it is reported that the polymer becomes brittle. Consequently, it is concluded that the aliphatic acid halides preferably should have the two acid halide groups separated by a divalent hydrocarbon radical having a chain of at least four carbon atoms.

In U.S. Pat. No. 3,169,121, there is described a copolyester having recurring carbonate groups and carboxylate groups. One of the objectives of the patent is to improve solvent resistant properties of the polyesters. The polymers are prepared by the reaction of a dihydric phenol, a difunctional carboxylic acid and a carbonyl halide. Solvent properties are improved, but no to a point where the copolyesters are commercially valuable for use in organic solvent environments.

In U.S. Pat. No. 3,234,167, there is disclosed a polyester corresponding to the following general structural formula:

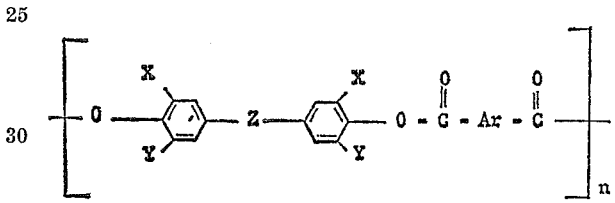

where $n$ is an integer so chosen that the molecular weight of the polymeric material is at least about 10,000 and may be at high as 20,000; Ar is meta- or para-arylene which may additionally contain one or more substituents selected from the group of halogen or monovalent lower alkyl radicals; X and Y are halogen, lower alkyl, lower alkoxy or other inert substituents and Z is a carbon-to-carbon bond or a divalent radical chosen from among the following:

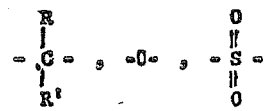

The polymers of this patent, though having a structural formula similar to that for the polymers of the subject invention, are reported to be soluble in organic solvents. For example, a polymer formed from 4,4'-isopropylidene bis-(2,6-dichlorophenol) and isophthaloyl chloride is reported to be soluble in tetrahydrofuran, chloroform, N,N-dimethylacetamide, a 70/30 mixture of trichloroethane and trichloroacetic acid and in other single and mixed solvents.

STATEMENT OF THE INVENTION

The present invention is predicated upon the discovery that polyesters derived from 4,4'-sulfonyl diphenols and polybasic acids selected from the group of substituted and unsubstituted malonic, glutaric and pimelic acids and acid derivatives thereof are resistant to common organic solvents and have substantially the same or better general physical properties than the polyesters of the prior art. Consequently, the polyesters of this invention are useful for the same general purposes as prior art polyesters, use common materials for their formation and consequently are low in cost, and have extended usage in organic solvent environments due to excellent resistance to organic solvents.

The polyesters of this invention are linear and may be represented by the following formula:

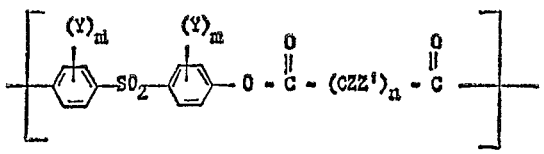

where Y is an inert substituent attached to the phenylene nucleus and may be a halogen, an inorganic group such as a nitro group, an organic group such as a monovalent hydrocarbon group of 1–8 carbon atoms or an oxy group such as OR where R is a monovalent hydrocarbon group of 1–8 carbon atoms; Z and Z' are individually selected from the group of hydrogen, lower alkyl (i.e. preferably up to 6 carbon atoms) and halogen; the letter $m$ is any whole number from and including 0 to the number of positions on the phenyl radical available for substitution; and the letter $n$ is 1, 3 or 5. The polymer should have a sufficient number of repeating units for a molecular weight of at least 10,000. The preferred polyesters are those derived from glutaric acid and either 4,4'-sulfonyl diphenol; 4,4'-sulfonyl-di-(2,6-xylenol), 4,4' - sulfonyl-bis-(2,6-dichlorophenol), or 4,4'-sulfonyl-bis-(2,6-dibromophenol).

The resistance to common organic solvents exhibited by the polyesters of this invention is unexpected as polyesters formed using aliphatic dicarboxylic acids which are the next lower or higher homologues of the dicarboxylic acids used in the invention are not solvent resistant and are readily dissolved by contact with organic solvents. In addition to the solvent resistant properties, the polyesters are characterized by an excellent combination of physical properties that make them desirable for extensive commercial use. For example, they possess a sufficiently high heat distortion temperature to withstand exposure under stress to at least 100° C. without more than minimal distortion. In addition, they have sufficient surface hardness and resistance to inelastic deformation (creep) to be useful in applications such as bearings, gears and the like. They also have a sufficiently low melt viscosity at temperatures of 300° C. or less to allow molding in conventional equipment and other properties required to classify a molding resin as "easily moldable."

DESCRIPTION OF THE PREFERRED EMBODIMENTS

The linear polyesters of this invention are derived from a 4,4'-sulfonyl diphenol and specific aliphatic carboxylic acids. The term "a 4,4'-sulfonyl diphenol" is intended to include 4,4'-sulfonyl diphenol and substituted 4,4'-sulfonyl diphenols. The 4,4'-sulfonyl diphenols used in the reaction may be represented by the following formula:

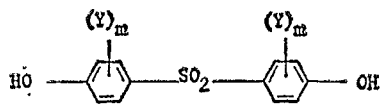

where Y and $m$ have the meaning noted above. Typical examples of suitable sulfones include:

4,4'-sulfonyl diphenol
4,4'-sulfonyl-bis-(2-chlorophenol)
4,4'-sulfonyl-di-(2,6-xylenol)
4,4'-sulfonyl-bis-(2,6-dichlorophenol)
4,4'-sulfonyl-bis-(2,6-dibromophenol)
4,4'-sulfonyl-di-(ortho cresol)
4,4'-sulfonyl-bis-(2-methyl-6-phenyl phenol)
4,4'-sulfonyl-bis(2-phenyl phenol)
4,4'-sulfonyl-bis(2-isopropyl phenol)
4,4'-sulfonyl-bis(3-nitro phenol)
4,4'-sulfonyl-bis(2,6-dibutyl phenol)
4,4'-sulfonyl-di(3,5 xylenol)
4,4'-sulfonyl-bis(2-bromo phenol)
4,4'-sulfonyl-bis(2,6-dimethoxy phenol)
4,4'-sulfonyl-bis(2,6-diphenyl phenol);

and the like. The preferred sulfones are 4,4'-sulfonyl diphenol; 4,4'-sulfonyl-di(2,6-xylenol), 4,4'-sulfonyl-bis(2,6-dichlorophenol), and 4,4'-sulfonyl-bis(2,6-dibromophenol). In addition, commercially available 4,4'-sulfonyldiphenols frequently contain various of its isomers. These isomers are tolerable in amounts up to about 15% by weight of the total sulfonyl diphenol.

The linear polyesters of this invention can also consist of mixtures of homopolymers of the 4,4'-sulfonyl diphenols. For example, the linear polyester can be a mixture of a homopolymer derived from 4,4'-sulfonyl diphenol and glutaric acid and a homopolymer derived from 4,4'-sulfonyl-di(2,6-xylenol) and glutaric acid.

The polybasic acid used to form the polyesters of this invention is one selected from the group consisting of substituted and unsubstituted malonic, glutaric and pimelic acids and the acid derivatives thereof. Of these, glutaric acid is most preferred. Malonic acid is less preferred as this material is unstable and difficult to handle in the polymerization reaction. Pimelic acid is less preferred as the polyesters formed therewith have improved solvent resistance properties, but are substantially less solvent resistant than the polyesters formed using either malonic acid or glutaric acid. It is of interest that those polyesters having improved solvent resistance are formed from carboxylic acids having 1 or 3 carbon atoms between the carboxyl groups of the acid and to a lesser extent, 5 carbon atoms between the carboxyl groups of the acid. Polyesters formed using aliphatic carboxylic acids that are the next homologues or higher homologues of these acids—i.e., succinic acid, adipic acid, sebacic acid and the like, are not solvent resistant and are attacked by organic solvents to substantially the same extent as the polyesters of the prior art. The acid derivatives of the polybasic acids include such acid derivatives as the acid anhydrides, the acid halides, the acid esters, the acid amides, the acid azides and mixed acid anhyrides.

The term "solvent resistant" and terms similar thereto as used in this disclosure means that the polyesters of the invention are substantially insoluble and will not swell appreciably in most of the common organic solvents known to attack the prior art polyesters. However, this is not intended to imply that the polyesters of the invention will not be attacked by any solvent as certain specific solvents will dissolve or cause swelling of these polymers. For example, they have been found to be soluble in a 1 to 1 mixture of tetrachloroethane and phenol, a mixture that is known to be a unique solvent system for polyester materials such as polyethylene terephthalate. In addition, the polyesters, though resistant to o-dichlorobenzene and other halogenated solvents at room temperature are attacked to some extent at elevated temperatures.

The method for forming the polyesters of this invention are those conventionally used in the art for preparing polyesters and are not considered to be a part of this invention. Typical methods for preparing high molecular weight polyesters include interfacial polymerization and solution polymerization under controlled conditions. The polymers may be prepared from nearly equimolar amounts of the appropriate sulfone and acid halide, for example, by interfacial polymerization in the presence of a catalyst. In accordance with the usual interfacial polymerization procedures, the reactants are present in different liquid phases which are immiscible with each other and which, in the preparation of the polymers, constitute two solvent media. Thus, the sulfone is dissolved in one solvent medium, the halide is dissolved in a second solvent medium immiscible with the first, the necessary catalyst is added, and the solutions are rapidly combined with vigorous agitation. An alkaline aqueous medium can serve as the solvent for the sufone and an organic solvent is utilized with the acid halide. Suitable catalysts for interfacial polymerization techniques include the quaternary ammonium salts, phosphonium salts, sulfonium salts, hydrazidium salts, the corresponding hydroxides of these salts, p-toluene sulfonic acid, boron fluoride complexes, etc.

The polymers of this invention may also be prepared from nearly equimolar amounts of the appropriate sulfone and acid halide by a solution polymerization procedure in the presence of a suitable catalyst or acid acceptor. In accordance with the usual procedures where solution techniques are employed, the reactants are present in a common solvent. Thus the sulfone and the acid halide are dissolved in separate portions of the solvent chosen, the catalyst or acid acceptor is added, and the solutions are combined with agitation. The hydrogen halide which is evolved as a by-product of the condensation reaction may be effectively removed by the use of an acid acceptor such as a tertiary amine, for which purpose an amine which has a high base strength is required. Suitable tertiary amines have a $pK_a$ value of at least about 9 when measured in water at 25° C. Where higher temperatures are utilized, the hydrogen halide may be spontaneously volatilized.

Solution polymerization may be affected at temperatures ranging from room temperature to 220° C. or above. The use of temperatures within the upper portions of this range are preferred. Catalysts of the type employed in interfacial polymerization are effective when higher temperatures are used. By the use of such catalytic agents, condensations may be effected even with sulfones which have hitherto been non-reactive under condensation polymerization conditions. The polymer-forming reaction may be carried out in a continuous manner, by which the reactatns are continuously introduced to the reaction zone and the polymeric product is continuously prepared and withdrawn. Polymerization may also be accomplished in a batch process in which equimolar amounts of the reactants are initially introduced to a reaction vessel, the condensation polymerization is effected, and the product is isolated.

Alternative procedures for forming the polyesters of this invention include the reaction of a di-acetate of the sulfone with the acid at an elevated temperature with or without added solvent and an acidic or alkaline catalyst. Alternatively, the sulfone may be reacted directly with the acid or its anhydride in the presence of a dehydrating agent; e.g., acetic anhydride with or without an esterification catalyst, and a solvent to yield polymer. Other methods will be readily apparent to those skilled in the art.

The invention will be more fully illustrated by the following examples:

EXAMPLE 1

A 100 ml. resin reaction flask was equipped with a mechanical, sealed stirrer, thermometer, inlet port with purge tube and a reflux condenser attached to the reactor by a Dean-Stark trap provided with an addition connection to permit returning the trapped solvent to the reactor if desired. The flask was heated externally with an electric heating mantle controlled by a capacitive relay operating from the thermometer to maintain constant temperature.

The flask was charged with 10 grams (0.03264 mole) of 4,4'-sulfonyl-di(2,6-xylenol), 50 ml. of a chlorinated diphenyl and 50 ml. of benzene. The flask was heated to distill off the benzene thereby removing any traces of water that might be present. The last 15 ml. of benzene to distill over was used to wash 5.516 gm. (0.03264 mole) of glutaryl dichloride (freshly distilled) into the reactor. The mixture was gradually heated to 170° C., trapping out and removing the benzene that distilled over. A rapid evolution of hydrogen chloride was observed. After one hour at 170° C., the temperature was increased to 185° C. for one and one-half hours and finally to 200° C. for one hour.

The viscous reaction mixture was allowed to cool thereby changing to a tough, rubbery clot that was removed from the reactor and broken up with a high speed blender in the presence of excess methanol. After several washings in methanol, the product was re-dissolved in ortho-dichlorobenzene at a temperature of 120° C. and the hot solution added in a thin stream to an excess of methanol in a high speed blender. The precipitated polymer was washed with methanol and vacuum dried at 140° C. for four hours. A stringy, off-white product was obtained that weighed 11.9 grams (90.6% of theoretical yield).

Part of the product was compression molded in a heated platen press at 200° C. and 10,000 p.s.i. into a light yellow tough, transparent sheet. The flashings from this molded part were not soluble in chloroform at room temperature.

The material was subjected to analysis by differential scanning calorimetry that indicated that the material underwent a glass transition at a temperature of between 181 and 183° C. and underwent crystalline melting at a temperature between 380 and 400° C.

EXAMPLE 2

A larger quantity of the polyester of 4,4'-sulfonyl-di-(2,6-xylenol) and glutaryl dichloride was prepared by a scale-up to a large reactor using the methods described in Example 1 above. The product was again re-precipitated from a hot filtered solution in o-dichloro-benzene into an excess of methanol. The dried product had an intrinsic viscosity (in a 1 to 1 mixture of tetrachloro-ethane and phenol at 30° C.) of 0.95 deciliter per gram (dl./g.). The product was extruded in a ¾" laboratory extruder at a barrel temperature of 400° F. and a nozzle temperature of 450° F. The resulting strand was chopped into small pellets. The pellets were molded in a 2½ ounce Van Dorn injection molding machine into impact bars measuring ⅛" by ½" by 2½" using a cylinder temperature of 500° F. and a mold temperature of 200° F. with a mold cycle of 24 seconds.

The molded bars were submitted to a number of mechanical tests, including tensile testing. The tests were performed on bars that had been milled down in the center to yield a dumbbell shape with a ⅛" waist. The results are set forth in the following table:

| | |
|---|---|
| Izod impact, notched (ft.-lb./inch) | 0.66–0.69 |
| Heat distortion temperature (° C.–264 lb.) | 147 |
| Tensile strength (max.—p.s.i.) | 10,660 |
| Tensile modulus (p.s.i.) | 267,000 |
| Elongation (percent) | 13.5 |
| Flexural strength | No Break |
| Flexural yield strength (p.s.i.) | 15,370 |
| Flexural modulus (p.s.i.) | 309,000 |
| Hardness, Rockwell M | 94–100 |

EXAMPLE 3

To determine the effect of common solvents on the properties of the polyester of Example 2, a number of the molded, dumbbell shaped test bars were submerged in various representative solvents for the times indicated in the following table and the solvent take up as well as the tensile properties of the solvent-wet bars determined, with the following results:

| Solvent | Wt. increase in 24 hr., percent | Max. tensile str., p.s.i. | Tensile mod., p.s.i. | Elongation, percent |
|---|---|---|---|---|
| Control | | 10,660 | 267,000 | 13.3 |
| Water | 0.35 | 9,670 | 211,940 | 20.5 |
| Isopropyl alcohol | 0.0 | 10,151 | 220,250 | 6.7 |
| Acetic acid | 2.9 | 9,377 | 216,450 | 10.8 |
| n. Butyl acetate | 1.2 | 9,742 | 225,530 | 8.0 |
| n. Heptane | 0.0 | 10,450 | 233,370 | 19.2 |
| Benzene | 2.7 | 8,820 | 190,470 | 7.3 |
| Gasoline | 0.0 | 9,330 | 243,850 | 5.2 |
| Acetone | 28.5 | 1,700 | 26,400 | 19.8 |
| Trichloroethylene | 38 | 2,030 | 35,250 | 24.5 |
| Chlorobenzene | 41 | 1,430 | 19,290 | 25.0 |

The table shows that most solvents have little or no effect on the properties of the material, even after prolonged immersion. The few solvents that do affect the tensile properties after prolonged exposure, notably the chlorinated hydrocarbons and the lower ketones nevertheless do not dissolve the material to any measureable extent. On short-term exposure, these solvents leave the molded parts unchanged.

EXAMPLE 4

The procedure of Example 1 was repeated with the substitution of 4.618 grams of malonyl dichloride (0.03276 mole—0.37% excess) for glutaryl dichloride. Rapid evolution of hydrogen chloride gas was observed at 90° C. Over the next four hours, the temperature was gradually raised to 180° C., at the same time maintaining slow nitrogen purge to prevent oxidation of the reaction products. During this time, the product fell out-of solution. The temperature was further raised to 210° C. to re-dissolve the product, and was maintained at this level for the next 2 hours. After cooling, the contents of the reactor were added to excess heptane in a high speed blender, solids filtered off, washed with methanol and dried at 125° C. The product was yellow-brown in color and weighed 12.1 grams (99% of theoretical). It was insoluble in chloroform at room temperature. It's intrinsic viscosity (in a 1 to 1 mixture of tetrachloroethane-phenol solvent) was 0.12 dl./g.

EXAMPLE 5

The procedure of Example 1 was repeated with the substitution of 6.432 grams of pimelyl dichloride (0.03264 mole) for glutaryl dichloride. The product was obtained in quantitative yield. It was slightly soluble in chloroform but insoluble in acetone. It had an intrinsic viscosity of 0.16 dl./g. in chloroform.

For purposes of comparision the procedure of Example 1 was repeated for the preparation of polyesters using the next homologues of glutaric acid.

EXAMPLE 6

The procedure of Example 1 was repeated substituting 5.06 grams of succinyl dichloride (0.03265 mole) for glutaryl dichloride. The product obtained weighed 11.4 grams (90% of theoretical), but was fully soluble in chloroform and acetone. It had an intrinsic viscosity in chloroform at 30° C. of 0.13 dl./g.

EXAMPLE 7

The procedure of Example 1 was repeated substituting 5.974 grams of adipyl dichloride for glutaryl dichloride. The product weighed 9 grams and was of a low molecular weight, was soluble in chloroform and acetone and had an intrinsic viscosity of less than 0.10 dl./g.

An alternate procedure was used to prepare the above polyester in order to obtain a higher molecular weight product and thereby provide a better comparison with the polyester of Example 1. The procedure comprises reacting 16.296 grams of the di-acetate of the 4,4'-sulfonyl di(2,6-xylenol) (0.0417 mole) with 6.100 grams of adipic acid (0.0417 mole) and a small quantity of p-toluene sulfonic acid in 10 ml. of chlorinated biphenyl at 200° C. for twenty hours. The product was recovered in methanol and dried. The intrinsic viscosity was 0.2 dl./g. (in chloroform at 30° C.). The material was soluble in both chloroform and acetone.

EXAMPLE 8

A polyester was prepared following the procedure of Example 1 using 10 grams 4,4'-sulfonyl diphenol (0.03996 mole) and 6.822 grams glutaryl dichloride (0.0404 mole). Rapid evolution of hydrogen chloride gas started at 150° C. After one-half hour at 150° C., the temperature was raised to 180° C. for two hours. The product at that time had precipitated from solution. The reaction mixture was heated to 220° C., but the polymer did not re-dissolve. After cooling, the polymer was lifted from the solvent and an attempt was made to dissolve it in boiling chlorobenzene. The polymer did not dissolve. Thereafter, the polymer in the form of a lump was left overnight in a solvent consisting of a mixture of 1 to 1 tetrachloroethane and phenol. It was softened sufficiently to allow removal of the polymer from the stirrer. The product was precipitated and thoroughly washed with methanol.

EXAMPLE 9

Test bars were prepared from the polymer of Example 8 and placed in various solvents at room temperature for twenty-four hours to measure solvent swelling properties. The following results were observed.

|  | Percent |
| --- | --- |
| Water | 0.5 |
| Isopropyl alcohol | 0 |
| Acetic acid | 0.6 |
| n.Butyl acetate | 0 |
| n.Heptane | 0 |
| Benzene | 0.1 |
| Gasoline | 0 |
| Acetone | 6.8 |
| Trichloroethylene | 1.2 |
| Chlorobenzene | 1.6 |

The test bars, as molded, had a heat distortion temperature (under 264 lbs. load) of 114° C.

EXAMPLE 10

The procedure of Example 1 was repeated using 13.66 grams (0.03520 mole) of 4,4'-sulfonyl-bis-(2,6-dichlorophenol) and 5.960 grams (0.0356 mole) glutaryl dichloride. The polymeric reaction product was compression molded into test bars with a heat distortion temperature of 103° C. (264 lbs. load). The polymer was completely insoluble in the common organic solvents.

EXAMPLE 11

The procedure of Example 1 may be repeated using 10 grams (0.03264 mole) of 4,4'-sulfonyl-di(2,6-xylenol) and 5.963 grams (0.03264 mole) of 2-methyl glutaryl dichloride.

EXAMPLES 12–16

The procedure of Examples 1, 4 or 9 may be repeated substituting the following sulfones for the sulfone of said examples:

4,4'-sulfonyl-bis(2,6-dibromophenol)
4,4'-sulfonyl-bis(2,6-diphenyl phenol)
4,4'-sulfonyl-di(3,5-xylenol)
4,4'-sulfonyl-di(ortho cresol)
4,4'-sulfonyl-bis(2,6-dimethoxy phenol)

Polyesters prepared using the above sulfones are resistant to substantially the same class of solvents as the polyesters of Examples 1, 4 and 9 and have similar mechanical properties.

As noted above, the polyesters of this invention are characterized by insolubility at room temperature in many common organic solvents and water; and solvent resistant, as indicated by a limited effect of contact with common solvents on the tensile properties of the material. In addition, the polyesters are characterized by sufficiently high heat distortion temperature to withstand exposure under stress to at least 100° C. without more than minimal distortion, possess excellent surface hardness and resistance to inelastic deformation (creep), and have sufficiently low melt viscosity at temperatures of 300° C. or less to allow molding in conventional equipment, and other properties generally required to classify a molding resin as "easily moldable." This combination of properties renders the polyesters of this invention useful for substantially the same purpose as the polyesters of the prior art and in addition, because of their excellent solvent resistant properties, they are useful for many purposes for which the polyesters of the prior art are unsuitable.

As will be readily apparent to those skilled in the art, obvious modifications and different embodiments may be used in carrying out the invention, such as by adding pigments, fillers, stabilizers, plasticizers, other polymers, etc., which may be added during the process of making the polymer to modify the properties without departing from the scope of the invention. Also, blends of the polyesters may be prepared without departing from the scope of the invention. It is therefore to be understood that changes may be made in the particular embodiments of the invention which are within the full intended scope of the invention as defined by the appended claims.

I claim:

1. A polyester having a molecular weight of at least 10,000 and resistant to solution and swelling in halogenated solvents and consisting essentially of recurring units of the formula

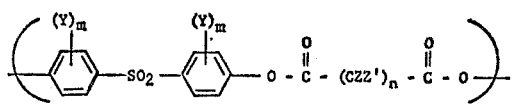

where Y is an inert substituent selected from aryl, alkyl, alkoxy and halogen attached to the phenylene nucleus; Z and Z' are individually selected from the group of hydrogen, lower alkyl and halogen; $m$ represents a whole number equal to from 0 to the number of replaceable hydrogen atoms on the phenylene nucleus and $n$ is 1, 3 or 5.

2. The polyester of claim 1 where Z and Z' are each hydrogen.

3. The polyester of claim 1 characterized by insolubility in chloroform.

4. The polyester of claim 2 where Y is selected from the group of aryl, alkyl, alkoxy and halogen.

5. The polyester of claim 2 where $m$ is 2 and the Y's are in the positions ortho to the hydroxyl groups. in the positions ortho to the hydroxyl groups.

6. The polyester of claim 5 where each Y is methyl.

7. The polyester of claim 6 where $n$ is 3.

8. The polyester of claim 2 where $m$ is 0.

9. The polyester of claim 8 where $n$ is 1.

10. A polyester having a molecular weight of at least 10,000 and resistant to solution and swelling in halogenated solvents and consisting essentially of recurring units of the formula:

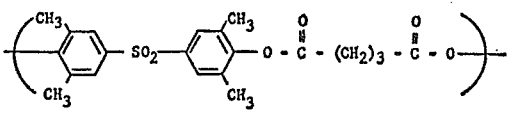

11. A polyester having a molecular weight of at least 10,000 and resistant to solution and swelling in halogenated solvents and consisting essentially of recurring units of the formula:

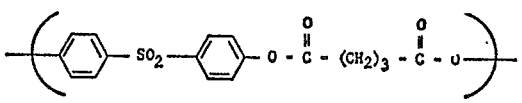

12. A polyester having a molecular weight of at least 10,000 and resistant to solution and swelling in halogenated solvents and consisting essentially of recurring units of the formula:

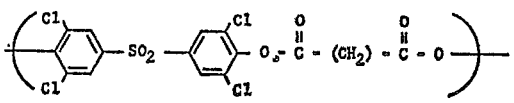

References Cited

UNITED STATES PATENTS

| | | | |
|---|---|---|---|
| 2,595,343 | 5/1952 | Drewitt et al. | 260—47 |
| 3,234,167 | 2/1966 | Sweeny | 260—30.4 |
| 3,262,914 | 7/1966 | Goldberg | 260—49 |

WILLIAM H. SHORT, Primary Examiner

L. L. LEE, Assistant Examiner

U.S. Cl. X.R.

260—33.4 P, 33.8 R

PO-1050
(5/69)

UNITED STATES PATENT OFFICE
CERTIFICATE OF CORRECTION

Patent No. 3,652,499          Dated March 28, 1972

Inventor(s) Willem F. H. Borman

It is certified that error appears in the above-identified patent and that said Letters Patent are hereby corrected as shown below:

Column 9, line 34, delete; Column 9, line 38, delete "1" and insert -- 3 --.

Signed and sealed this 23rd day of January 1973.

(SEAL)
Attest:

EDWARD M. FLETCHER, JR.          ROBERT GOTTSCHALK
Attesting Officer          Commissioner of Patents